United States Patent
Begeer et al.

(10) Patent No.: US 10,461,987 B2
(45) Date of Patent: Oct. 29, 2019

(54) VOICE AND TEXT DATA SERVICE FOR MOBILE SUBSCRIBERS

(71) Applicant: iVent Mobile B.V., Laren (NL)

(72) Inventors: Carel Begeer, Laren (NL); Kees Jan Mink, Laren (NL)

(73) Assignee: iVent Mobile B.V., Laren (NL)

( * ) Notice: Subject to any disclaimer, the term of this patent is extended or adjusted under 35 U.S.C. 154(b) by 63 days.

(21) Appl. No.: 15/535,092

(22) PCT Filed: Dec. 17, 2015

(86) PCT No.: PCT/NL2015/050871
§ 371 (c)(1),
(2) Date: Jun. 12, 2017

(87) PCT Pub. No.: WO2016/099265
PCT Pub. Date: Jun. 23, 2016

(65) Prior Publication Data
US 2017/0366388 A1 Dec. 21, 2017

(30) Foreign Application Priority Data
Dec. 19, 2014 (NL) ...................................... 2014020

(51) Int. Cl.
*H04W 12/06* (2009.01)
*H04W 88/10* (2009.01)
*H04L 29/06* (2006.01)

(52) U.S. Cl.
CPC .... *H04L 29/06952* (2013.01); *H04L 63/0892* (2013.01); *H04L 63/162* (2013.01); *H04W 12/06* (2013.01); *H04W 88/10* (2013.01)

(58) Field of Classification Search
CPC ........... H04L 29/06952; H04L 63/0892; H04L 63/162; H04L 12/06; H04W 88/10
See application file for complete search history.

(56) References Cited

U.S. PATENT DOCUMENTS

2003/0171112 A1* 9/2003 Lupper ................. H04M 15/49
455/414.1
2007/0254648 A1* 11/2007 Zhang ............... H04L 29/06027
455/433

(Continued)

FOREIGN PATENT DOCUMENTS

EP         1624639 A1    2/2006
WO      2013000645 A1    1/2013
WO      2013134669 A1    9/2013

OTHER PUBLICATIONS

"Generic Access Network (GAN); layer 3, specification; ETSI TS 144 318", European Telecommunications Standards Institute (ETSI) Standard, Jul. 2008 (Jul. 2008), table 10.1.36.1, sect. 11.2.1.

(Continued)

*Primary Examiner* — Jeffrey C Pwu
*Assistant Examiner* — Rodman Alexander Mahmoudi
(74) *Attorney, Agent, or Firm* — N.V. Nederlandsch Octrooibureau; Catherine A. Shultz; Tamara C. Stegmann (57) ABSTRACT

Method and intelligent subscriber management unit for enabling voice and text data service from a public communication network (7) to a mobile subscriber device (1). Authenticating the mobile subscriber device (1) is achieved using a home location register (8) and/or authentication center (9), while the mobile subscriber device (1) is in reach of an access point (2) of a data network (3). A challenge response is received from a subscriber identity module (SIM) of the mobile subscriber device (1), and includes the international mobile subscriber identity (IMSI (16)). The IMSI (16) is stored in a visitor location register (17) which is attached to the home location register (8). Then conversion of voice and text data service is executed between a first (Continued)

data format suitable for the public communication network (7) and a second data format suitable for the data network (3).

12 Claims, 6 Drawing Sheets

(56) References Cited

U.S. PATENT DOCUMENTS

2008/0109331 A1* 5/2008 Stadelmann ......... G06Q 20/123
705/34
2013/0094637 A1* 4/2013 Shaw ................ H04M 3/42059
379/88.18

OTHER PUBLICATIONS

"Generic Access Network (GAN); Stage 2; ETSI TS 143 318", Eur0pean Telec0mmunications Standards Institute (ETSI) Standard, Jul. 2008 (Jul. 2008) sect. 4,,sect. 5.2, figure 22, sect. 8.10, sect. 8.19, figure A.1, sect. A.1.1.

* cited by examiner

VOICE AND TEXT DATA SERVICE FOR MOBILE SUBSCRIBERS

FIELD OF THE INVENTION

The present invention relates to a method for enabling voice and text data service from a public communication network to a mobile subscriber device, comprising authenticating the mobile subscriber device using a home location register and/or authentication center associated with the mobile subscriber device, while the mobile subscriber device is in reach of an access point associated with a data network, wherein authenticating comprises
receiving an identity response from the mobile subscriber device in response to an identity request packet sent from the access point to the mobile subscriber device;
forwarding the identity response to the home location register and/or authentication center; and receiving identification triplets in response;
challenging the mobile subscriber device using the identification triplets, and receiving a challenge response from a subscriber identity module (SIM) of the mobile subscriber device, the challenge response including the international mobile subscriber identity (IMSI).

PRIOR ART

European patent publication EP-A-1 624 639 discloses a method and system for SIM-based authentication over access networks not supporting the security protocol IEEE 802.1X. A user, by means of a user terminal, authenticates towards an EAP-SIM server in a mobile operator network, via an access point connected to a WISP network. Temporary credentials are stored in a local database in the mobile operator network.

International patent publication WO2013/000645 discloses a method of providing access for wireless terminals to a packet core network, specifically intended to accomplish data off-loading to an IP network.

SUMMARY OF THE INVENTION

The present invention seeks to provide a method and system allowing mobile phone users to initiate and receive both voice calls and SMS, reachable under their own mobile telephone number and SIM, while the phone is in "flight mode", i.e. the mobile phone module is switched off and only a wireless local area network (WLAN) connection is available.

According to the present invention, a method according to the preamble defined above is provided, wherein authenticating further comprises storing the IMSI in a visitor location register and attaching the visitor location register to the home location register; and the method further comprises conversion of voice and text data service between a first data format suitable for the public communication network and a second data format suitable for the data network, and providing a communication path for the voice and text data service to the mobile subscriber device.

Thus according to the present invention, method and system embodiments have been described for providing roaming to a mobile subscriber for voice, SMS and data, without a 3GPP access network.

In a further aspect, an Intelligent Subscriber Management Unit (ISMU) is provided according to the present invention, comprising a visitor location register, an interface to a public communication network and an interface to a mobile subscriber device via a data network,
wherein the intelligent subscriber management unit comprises a first part arranged to authenticate a mobile subscriber device using a home location register and/or authentication center associated with the mobile subscriber device, while the mobile subscriber device is in reach of an access point associated with the data network, wherein authenticating comprises
receiving an identity response from the mobile subscriber device in response to an identity request packet sent from the access point to the mobile subscriber device;
forwarding the identity response to the home location register and authentication center; and receiving identification triplets in response;
challenging the mobile subscriber device using the identification triplets, and receiving a challenge response from a subscriber identity module (SIM) of the mobile subscriber device, the challenge response including the international mobile subscriber identity (IMSI);
storing the IMSI in a visitor location register and attaching the visitor location register to the home location register; and further comprises a conversion part for conversion of voice and text data service between a first data format suitable for the public communication network and a second data format suitable for the data network, and providing a communication path for the voice and text data service using the interface to the public communication network and the interface to the data network.

This allows an easy integration into existing mobile communication and data network environments providing the functionality of the present invention method embodiments.

SHORT DESCRIPTION OF DRAWINGS

The present invention will be discussed in more detail below, using a number of exemplary embodiments, with reference to the attached drawings, in which.

DETAILED DESCRIPTION OF EXEMPLARY EMBODIMENTS

The present invention embodiments make it possible for mobile phone users to initiate and receive both voice calls and SMS, reachable under their own mobile telephone number and SIM, while the phone is in "flight mode". The phone module is switched off and only a WLAN connection is needed.

The solution, provided by the present invention embodiments, targets private WLAN environments that are e.g. not covered by (private) GSM (3GPP) services. This can be due to legislation or other factors like strict certification of technical environments. Satellite communications are usually available in aeronautical environments but on-board telephony services are limited to outgoing voice calls only. There is a demand for full-featured voice and text (SMS) functionality using one's own telephone number. There are cases of WLAN being used to off-load data traffic in 3GPP environments (see e.g. International patent publication WO2013/000645 described above) but enabling voice and SMS over WLAN is new, especially via satellite connections. In addition, the solution should work for subscribers from any mobile (3GPP) network.

The invention embodiments presented here relate to a method and system for mobile (3GPP) subscribers to use data, voice and SMS services without the presence of a 3GPP radio access network. The subscribers are able to use a radio access network other than 3GPP (GSM/UMTS/LTE, etc.) to use data (Internet, IP) services. In addition, it is also possible to initiate and receive voice calls as well as send and receive SMS messages on their own unique subscriber number, the known MSISDN. This invention operates with the mobile 3GPP radio unit switched off, referenced to as Flight-Mode, and an alternatively available (IP) data access unit switched on, whereas the subscriber's communication device is authenticated to the alternative (radio) access network by means of an international mobile subscriber identity (IMSI) stored on the SIM card of the device.

Figure 1:
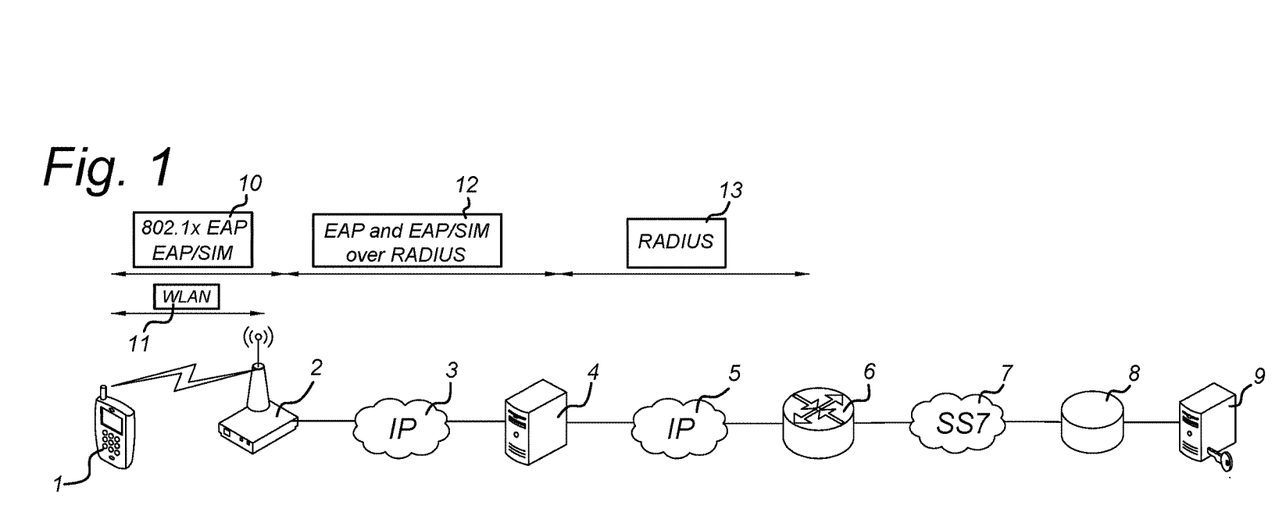
FIG. 1 shows a schematic view of an architecture in relation to a mobile subscriber device according to a prior art implementation.

FIG. 1 shows a schematic view of prior art communications involving a mobile subscriber device 1 which is in communication with an access point 2 connected to a data (IP) network 3. The communication between access point 2 and mobile subscriber device 1 is e.g. implemented in a wireless local area network (WLAN) 11 environment. The chain towards a home mobile network operator environment further comprises a RADIUS server 4 which is used to implement authentication (see further below) via a further IP network 5 and MAP proxy 6, which is connected to a public communication network 7 (e.g. SS7 based network 7), comprising a home location register HLR 8 and an authentication center AuC 9.

At the end of the 1990s the first industrial standards for wireless communication networks were defined and given names such as IEEE 802.11, HomeRF (both standards with gross bandwidth of 2 Mbit/s) or IEEE 802.11b (11 Mbit/s). The frequency of 2.4 GHz was originally reserved for industry, science and medicine use only and not for public use. Eventually the decision was made to use the ISM band (Industrial, Scientific, and Medical) also for wireless communication techniques like Bluetooth and WLAN. Nowadays IEEE 802.11b is the most common standard in use. Many amendments to the standard were defined to increase the bandwidth. IEEE 802.11g is in a special position here as it is downwardly compatible with IEEE 802.11. Also commonly known is the IEEE 802.11a standard which works in the 5 GHz band. Both standards reach a gross bandwidth of 54 Mbit/s. Table 2.1 shows all important WLAN related standards and their full names. Adoption of WLAN is broad and is usually the only network type available in environments with strict installation and/or radiation restrictions, such as airplanes. Various IEEE standards (also indicated as IEEE 802.1X) are listed in the following table:

| Standard | Full name |
| --- | --- |
| IEEE 802.11 | Working Group for Wireless LANs |
| IEEE 802.11a | High Data Rate Extension (6/12/24Mbit/s, opt. 9/18/36/54 Mbit/s) |
| IEEE 802.11b | High Data Rate Extension (5.5/11Mbit/s) |
| IEEE 802.11b-cor1 | Corrigendum to the MIB |
| IEEE 802.11e | MAC Enhancements for Quality of Service |
| IEEE 802.11f | Recommended Practice for Inter Access Point Protocol |
| IEEE 802.11g | Standard for Higher Rate (>20 Mbps) Extensions in the 2.4 GHz Band |
| IEEE 802.11h | SMa—Spectrum Managed 802.11a |
| IEEE 802.11i | Authentication and Security |
| IEEE 802.1x | Port Based Network Access Control |
| IEEE 802.15 | Working Group for Wireless Personal Area Networks (WPANs) |
| IEEE 802.16 | Working Group on Broadband Wireless Access Standards (Standard for Wireless Metropolitan Area Networks) |

The RADIUS protocol has been originally designed to be able to validate dial-up users. RADIUS stands for Remote Authentication Dial-In User Service and was standardized as RFC2058 in 1997. Since it was replaced by the RFC2138, which has been replaced by the RFC2865 and its extension RFCs. RADIUS supports three A's, i.e. Authentication, Authorization and Accounting. In the following the term authentication is used in this context, and may include authorization and accounting.

The RADIUS traditional architecture supports dial-in servers, called network access servers (NAS), which are deployable in any telecommunication company's backbone and can be accessed by the customer (i.e. telecommunication company) without the need to make any specific changes. Therefore it enables a centralized user management. When using such a system, it is necessary to take the following steps to establish a connection:

The user connects to the NAS via modem or ISDN.

Having successfully established a line connection between the modem and the NAS, the client sends his authentication credentials. This is done via a PPP internal authentication protocol such as PAP or CHAP. In this case EAP, which will be explained later.

These credentials are transferred via the RADIUS protocol to the RADIUS server, which checks the validity of the user's data. The check on the RADIUS server is possible via a user database, which for example can be stored on a SQL server. The result; accept or reject, is then sent back to the NAS, which depending on the result grants or denies access.

In addition it is possible to send further information with the RADIUS packet, for example which services the user is allowed to use.

For Assessing the Benefits of the RADIUS Protocol the Following Should be Noted:

The NAS is mainly a protocol conversion device from PPP internal authentication to RADIUS.

In common setups the NAS does not directly communicate with the actual authenticating server. It is common to use a RADIUS proxy which forwards the packets to the appropriate RADIUS server.

In order to support roaming, which requires a cascade of RADIUS server, the user name contains a postfix called "realm". This realm is separated by an @ from the user name. The realm helps the RADIUS server to forward the request for authentication to the correct database or RADIUS server.

RADIUS is not only used in dial-in or WLAN authentication solutions, but also for authenticating users on VPN gateways, firewall appliances or even web servers.

The GSM network (Global System for Mobile communication) is the leading mobile phone standard worldwide. This section summarizes it to a degree necessary in order to explain this invention. As within the conventional telephone network the subscriber identification is related to his fixed telephone number. In the conventional telephone system the phone number is bound to a telephone jack, in the GSM system it is bound to the Subscriber Identity Module (SIM). For confidentiality reasons GSM distinguishes between the call number MSISDN (Mobile Station International Subscriber Directory Number) and the subscriber identity IMSI (International Mobile Subscriber Identity). Only the MSISDN needs to be known to the public. The unique mapping MSISDN IMSI is done in the HLR (Home Location Register). Thus the IMSI, which is used for identification, is normally not known to anyone outside the network operation personnel of the GSM operator. The IMSI is stored in the SIM, to identify the SIM to the network. The IMSI and the assigned key Ki are integral parts of the mechanism to ensure the subscriber identity and confidentiality. The key Ki is stored safely on the SIM card and is never transmitted through the air interface. On the mobile phone operator side the Ki is stored at the AuC (Authentication Center) of the home network operator. GSM authentication uses a "challenge and response" method, the A3/A8 authentication algorithm (3GPP TS 43.020). It runs on the SIM card and receives a 128 bit random number (RAND) as challenge. The SIM calculates based on the RAND and the Ki a 32 bit response SRES and a 64 bit key Kc with an operator specific algorithm. The Kc key is used to encrypt the air interface of GSM. A GSM authentication triplet is a tuple containing the three GSM authentication credentials RAND, Kc and SRES.

The use of IEEE 802.1x offers an effective framework for authenticating and controlling user traffic into a protected network. One of its nice features is that it dynamically varies encryption keys. IEEE 802.1x uses the Extensible Authentication Protocol (EAP) originally specified for dial-up access. For details specifically on EAP, see IETF's RFC3748. EAP supports extensions for multiple authentication methods, such as SIM cards, public key certificates and password hashes but also methods for token cards, Kerberos, one-time passwords, certificates, and public key authentication are defined.

In the beginning of an 802.1x communication the supplicant is unauthenticated (i.e., the client device or mobile subscriber device as used herein). The authentication is started when the supplicant attempts to connect to an authenticator (i.e., 802.11 access point). The access point responds by enabling a port which only allows EAP packets from the client to an authentication server located on the wired side of the access point. The access point blocks all other traffic, such as IP, ICMP and DHCP packets, until the access point can verify the client's identity using an authentication server (e.g. RADIUS). Once authenticated, the access point opens the client's port for other types of traffic.

The start of an authentication depends on the configuration of the authenticator. After a successful association the authenticator sends an EAP identity request without supplicant interaction or the supplicant explicitly requests the EAP identity request via an EAPOL packet.

The supplicant answers that request with an EAP identity response. The authenticator forwards this packet to the authentication server which uses one of the authentication algorithms from the table described below with reference to EAP authentication methods.

Depending on the chosen authentication method challenge packets are exchanged between the supplicant and the authentication server via the authenticator.

The authentication server sends either an acceptance or reject message to the authenticator.

The authenticator sends an EAP success or reject packet to the supplicant. If the authentication server accepts the supplicant, the authenticator sets the port to authorized state and forwards additional traffic.

EAP/SIM specifies a mechanism for authenticating a supplicant to a network combined with a session key agreement via a GSM SIM card. The authentication is mutual. EAP/SIM also proposes some enhancements to the GSM authentication procedure. As EAP/SIM is an EAP method, the EAP/SIM frames are packed into RADIUS packets at the access point. As authenticator the access point only needs to support IEEE 802.1x and EAP. Currently most RADIUS servers provide a plugin which is able to handle EAP/SIM. The RADIUS server uses triplets to challenge the client. These triplets are provided by an HLR (Home Location Register) or AuC (Authentication Center).

| Method | Server Authentication | Supplicant Authentication | Dynamic Key Delivery | Security Risks |
|---|---|---|---|---|
| EAP/MD5 | None | Password hash | No | Identity exposed, Dictionary attack, Man-in-the-Middle (MitM) attack, Session hijacking |
| LEAP | Password hash | Password hash | Yes | Identity exposed, Dictionary attack |
| EAP/TLS | Public Key (Certificate) | | Yes | Identity exposed |
| EAP/TTLS | Public Key (Certificate) | | Yes | MitM attack |
| PEAP | Public Key (Certificate) | | Yes | MitM attack |
| EAP/SIM | Yes (see EAP/SIM section) | | Yes | Identity exposed |
| EAP/AKA | Yes (same as EAP/SIM) | | Yes | Identity exposed |

The EAP/SIM protocol improves the GSM authentication and key exchange, in that it combines multiple authentication triplets. This enables the generation of stronger authentication answers and session keys. Among the weaknesses of GSM authentication are the lack of mutual authentication and the fact that 64 bit encryption keys are not sufficient for data networks. 128 bits are considered as the minimum key length in data networks. To achieve this using multiple RANDS (random number) pose the challenges to obtain multiple Kc keys, which are then combined to a strong key material. The Kc keys are therefore not used directly at EAP/SIM but are utilized to derive stronger keys. The GSM authentication is also improved by a Message Authentication Code (MAC) to ensure the integrity of the authentication. With EAP/SIM the client issues a random number NONCE_MT to the network, in order to contribute to the key derivation. This prevents replay of EAP/SIM requests from previous exchanges.

With regard to authentication and encryption differences between EAP/SIM and GSM there are four main differences:

In the case of GSM only the client is authenticated and there is no way for the client to check if he is connected to a legal GSM provider. EAP/SIM provides a mutual authentication to prevent a man-in-the-middle attack as is possible with GSM.

In the GSM standard the key which is used to encrypt the air interface is only 64 bit long. In EAP/SIM it can be up to 128 bit long. The words "up to" are used because it depends on operator specific parameters including authentication algorithms, the strength of the Ki key, and the quality of the RAND challenges. For example some SIM cards generate Kc keys with 10 bits set to zero. Such restrictions can prevent the concatenation technique from yielding strong session keys.

To ensure the integrity of an EAP/SIM authentication the core authentication packets are hashed with HMAC-SHA1-128 as defined in the RFC2104. (The HMAC-SHA1-128 value is obtained from the 20 byte HMAC-SHA1 value by truncating the output to 16 bytes.)

The AT_IV and AT_ENCR_DATA attributes can be used to transmit encrypted information between the EAP/SIM client and server. Transmitting the TMSI or a re-authentication identity are 2 examples of tags transmitted encrypted.

All four differences render the EAP/SIM authentication superior to GSM with regards to security.

There are two methods of authentication and the various identity types in EAP/SIM. The content of this section is necessary to understand the EAP/SIM protocol, which is important to this invention. Three identity types are distinguishable:

permanent identity (IMSI): The permanent identity contains typically the IMSI of the SIM card and a Realm. It is only used during a full authentication.

pseudonym identity (TMSI): The pseudonym identity is transferred to the user during a full authentication within the encrypted part of an EAP/SIM packet. The identity may be used for a full authentication instead of the permanent identity. This protects the IMSI as it reduces the number of times it is transited in clear text through the air.

re-authentication identity: During a full authentication, a re-authentication identity will be issued to the client in the encrypted part. The client may use this identity to carry out a re-authentication without accessing the SIM card.

Some client implementations send "dummy IDs" to the RADIUS server within the EAP identity response packet. These pseudonyms are not known to the RADIUS server and the server therefore requests a real ID via an EAP/SIM packet. Dummy IDs are not defined in the EAP/SIM specification but are also not prohibited.

The full authentication is the base of the EAP/SIM protocol, with which it is possible to definitely identify a SIM card. The following steps take place during a full authentication and rely on triplets from the HLR/AuC.

1. The authentication begins with an EAP identity request packet from the authenticator (block 10 in FIG. 1).
2. The client transmits the permanent identity or the permanent pseudonym (block 12 in FIG. 1), from which the RADIUS server derives the permanent identity.
3. As the supplicant may use a permanent pseudonym unknown to the RADIUS server, the RADIUS server may request different identities until it has identified the supplicant. Within the EAP/SIM start packets, the supplicant and the authentication server also agree to a version of EAP/SIM.
4. For this identity the RADIUS server requests the necessary triplets from the HLR or AuC (block 13 in FIG. 1). These triplets contain the challenge and the result of the A3/A8 algorithms.
5. The RADIUS server sends the challenge to the client and then compares the answer with the result it received from the HLR or AuC. The supplicant calculates the answer within the SIM card.
6. After the successful authentication an authorization procedure is carried out.
7. This is followed by the RADIUS server sending the key material, for encrypting the air interface to the access point. The client has already derived the keys and so only receives the success message without the keys.

As during re-authentication the client does not access the SIM card, which takes some seconds, it is faster than full authentication. The time necessary for authentication is also decreased by the fact that fewer packets are exchanged. A re-authentication is only possible after a full authentication, because the client requires the temporary pseudonym, which is obtained during full authentication. In principle this full authentication does not have to happen in the same session. But since it can be a security problem it should be prevented by the RADIUS server. The RADIUS server should not accept a re-authentication at session start. Re-authentication provides the RADIUS server with the possibility to check if a client is still alive. During re-authentication a new air interface encryption key is calculated. It is also possible for an operator to logout an active user with a forced re-authentication. This is done by rejecting the re-authentication request.

1. The re-authentication begins with the access point sending an EAP Identity Request to the client.
2. The client returns a re-authentication identity to the access point, which forwards the packet to the RADIUS server.
3. The exchange of EAP/SIM start packets is optional in re-authentication as there is no need for a version negotiation. The server can explicitly request a re-authentication identity if the client did not send a valid one during step 2.
4. The RADIUS server, if it detects a valid re-authentication identity, sends a re-authentication request instead of an EAP/SIM Challenge request. The RADIUS server and the client calculate new session keys for encrypting the connection to the access point, using the master key from full authentication.
5. The RADIUS server sends the session keys to the access point together with the success message.

The standardization of EAP/SIM is proceeding in two steps. The first one is the EAP/SIM protocol version 1 and the second one includes future versions of the protocol. The aim of development was the standardization of version 1. This is now registered as RFC4186 in 2006. Since the last draft versions there are also no fundamental changes. For example a proposed change to the encryption was rejected to preserve downwards compatibility. Currently only two things can force changes: While the standard arises in the IP world, EAP/SIM also touches GSM standards. Therefore a special G3P taskforce made some proposals. The results of both work groups differ in some elements. For example they propose different realms. Some details of the security and functional aspects may change again. After all these are the parts with the largest changes between 11, 12 and 13. For example the client is now allowed to reject an authentication if the server does not send new triplets or if a triplet is used more than once through authentication.

Currently no plans exist to develop a version 2 of EAP/SIM. Still the possibility of future versions was considered during the design of version 1. It includes a version negotiation using the EAP/SIM start packets. It is also possible to use more than one version in parallel during migration of the clients. It is only necessary to change the RADIUS server to support both versions. The access point only implements IEEE 802.1x and EAP.

As well as EAP/SIM, EAP/AKA provides an Extensible Authentication Protocol (EAP) mechanism for authentication and session key distribution that uses the 3rd generation Authentication and Key Agreement mechanism (RFC 4187), specified for Universal Mobile Telecommunications System (UMTS) in TS33.102 and for CDMA2000 in S.S0055-A. UMTS and CDMA2000 are global 3rd generation mobile network standards that use the same AKA mechanism. AKA is based on challenge-response mechanisms and symmetric cryptography. AKA typically runs in a UMTS Subscriber Identity Module (USIM) or a CDMA2000 (Removable) User Identity Module ((R)UIM). Compared to the 2nd generation mechanisms such as GSM AKA, the 3rd generation AKA provides substantially longer key lengths and mutual authentication. The invention can use either EAP-SIM or EAP-AKA as they become available for specific target devices. A fallback to EAP-SIM may be the best option for implementation when AKA becomes broadly available.

This paragraph explains how the RADIUS server obtains the triplets from the HLR/AuC and describes a typical productive environment setup. The RADIUS server with the EAP/SIM plugin requests triplets from the HLR/AuC, here the problem is often that the HLR/AuC is in an SS7 network. This is a special non IP network which is used by GSM providers for their internal communication. A conversion device needs to be deployed between the IP and SS7 based network. The conversion device has to understand RADIUS on the one side and SS7 MAP on the other. The RADIUS server with EAP/SIM plugin then sends the triplets request via the RADIUS protocol to the conversion device which then sends the request as SS7 MAP SendAuthInfo request to the HLR/AuC. Once the conversion device receives the SS7 MAP SendAuthInfo response it generates the corresponding response RADIUS packet. Such devices, RADIUS server with EAP/SIM plugin and an interface into the SS7 world, are commercial available. However, current invention not only provides RADIUS—SS7 conversion but acts as an intelligent agent that places subscribers into a roaming scenario. Also the invention provides provisioning, rating and charging of the offered services.

Known in the state of the art for the billing of the service obtained by mobile units in GSM networks is the so-called TAP protocol (TAP: Transferred Account Procedure) of the Transferred Account Data Interchange Group (TADIG) of the GSM Association. GSM is based on the concept of roaming, which permits a user of a mobile radio device to use his or her mobile radio device in any desired country and network. The billing of the service obtained is thereby not at all a trivial matter, however. Worldwide today there are more than 400 GSM networks in operation, and in addition there exist an estimated more than 20,000 individual roaming agreements between the network operators. Thus behind the seemingly simple idea of roaming there lies an extremely complex process of data acquisition, data distribution and data evaluation in order to make the billing possible. The Transferred Account Procedure (TAP) is a method by which mobile radio network service providers exchange roaming billing information. Following TAP2 and TAP2+, TAP3 was launched on the 4th of June 2000. TAP3 can be termed today as the standard, although TAP is a further developing protocol. The invention uses TAP files to charge (differentiated) services to the end user that is subscribed to the service.

Current mobile (subscriber) devices that are used in combination with the invention are so-called smart devices that contain their own Operating System (OS) and are able to load software applications (Apps) to add functionality or perform specific actions towards the end-user and/or network connections that are available. Interaction between the end-user and the network becomes more and more common, providing end users with easy-to-use communication services. Described invention integrates with this specific software to prepare the device for communication with the central component of the invention. This enables the end-user to have the same experience when placing and receiving calls, as well as sending and receiving SMS messages. This software may also assist the end-user selecting the correct radio-access network when desired. The software application utilizes the smart device's Application Programming Interface (API) to fully integrate the technology chain. Once the end-user has subscribed to the services, enrollment of the software to the device enables the device to authenticate with the network so the core element of the invention can re-route the voice and SMS traffic towards the mobile device.

SIP (Session Initiation Protocol) is a signaling protocol used to create, manage and terminate sessions in an IP based network. A session could be a simple two-way telephone call or it could be a collaborative multi-media conference session. SIP has been the choice for services related to Voice over IP (VoIP) in the recent past. It is a standard (RFC 3261) put forward by Internet Engineering Task Force (IETF). SIP is still growing and being modified to take into account all relevant features as the technology expands and evolves. But it should be noted that the job of SIP is limited to only the setup and control of sessions. The details of the data exchange within a session e.g. the encoding or codec related to an audio/video media is not controlled by SIP and is taken care of by other protocols. SIP is limited to only the setup, modification and termination of sessions. It serves four major purposes SIP allows for the establishment of user location (i.e. translating from a user's name to their current network address).

SIP provides for feature negotiation so that all of the participants in a session can agree on the features to be supported among them.

SIP is a mechanism for call management—for example adding, dropping, or transferring participants.

SIP allows for changing features of a session while it is in progress.

Entities interacting in a SIP scenario are called User Agents (UA). User Agents may operate in two fashions, User Agent Client (UAC) (It generates requests and send those to servers) or User Agent Server (UAS) (It gets requests, processes those requests and generates responses).

In general we associate the notion of clients to the end users i.e. the applications running on the systems used by people. It may be a softphone application running on your PC or a messaging device in your IP phone. It generates a request when you try to call another person over the network and sends the request to a server (generally a proxy server).

Servers are in general part of the network. They possess a predefined set of rules to handle the requests sent by clients. Servers can be of several types:

Proxy Server: These are the most common type of server in a SIP environment. When a request is generated, the exact address of the recipient is not known in advance. So the client sends the request to a proxy server. The server on behalf of the client (as if giving a proxy for it) forwards the request to another proxy server or the recipient itself.

Redirect Server: A redirect server redirects the request back to the client indicating that the client needs to try a different route to get to the recipient. It generally happens when a recipient has moved from its original position either temporarily or permanently.

Registrar: One of the prime jobs of the servers is to detect the location of a user in a network. Users from time to time refresh their locations by registering (sending a special type of message) to a Registrar server.

Location Server: The addresses registered to a Registrar are stored in a Location Server.

Commands of SIP Include:

INVITE: Invites a user to a call

ACK: Acknowledgement is used to facilitate reliable message exchange for INVITEs.

BYE: Terminates a connection between users

CANCEL: Terminates a request, or search, for a user. It is used if a client sends an INVITE and then changes its decision to call the recipient.

OPTIONS: Solicits information about a server's capabilities.

REGISTER: Registers a user's current location

INFO: Used for mid-session signaling

Figure 7:
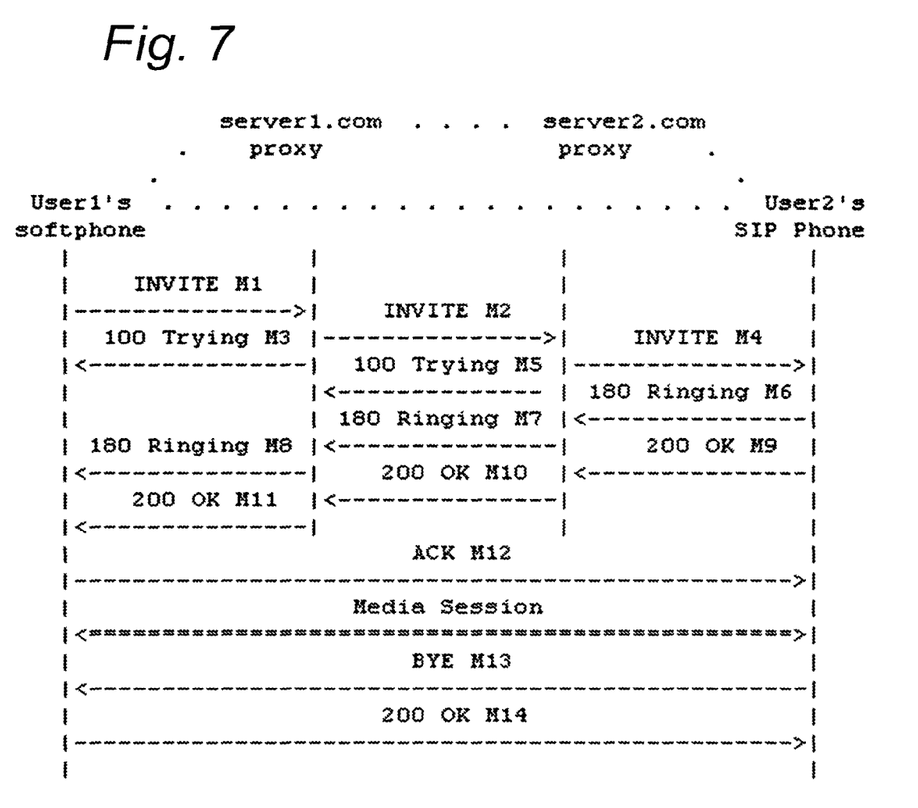
FIG. 7 shows an example of a typical Session Initiation Protocol ("SIP") session.

An example of a typical SIP session is shown in FIG. 7.

The present invention embodiments use, as such, existing technologies and methods (as described above) in combination and with additional features to deliver integration of voice and SMS into a data bearer other than the traditional 3GPP path. In the case of an alternative path like WLAN with 802.1x in a technology chain as described earlier new functionality becomes available.

In generic terms, the present invention relates to a group of embodiments, defined as a method for enabling voice and text data service from a public communication network 7 to a mobile subscriber device 1, comprising authenticating the mobile subscriber device 1 using a home location register 8 and/or authentication center 9 associated with the mobile subscriber device 1, while the mobile subscriber device 1 is in reach of an access point 2 associated with a data network 3 (e.g. a IEEE 802.1x network), wherein authenticating comprises receiving an identity response from the mobile subscriber device 1 in response to an identity request packet sent from the access point 2 to the mobile subscriber device 1;

forwarding (and optionally translating) the identity response to the home location register 8 and/or authentication center 9; and receiving identification triplets in response;

challenging the mobile subscriber device (1) using the identification triplets, and receiving a challenge response from a subscriber identity module (SIM) of the mobile subscriber device (1), the challenge response including the international mobile subscriber identity (IMSI (16));

storing the IMSI 16 in a (virtual) visitor location register 17 and attaching the visitor location register 17 to the home location register 8;

and further comprising conversion of voice and text data service between a first data format suitable for the public communication network 7 and a second data format suitable for the data network 3, and providing a communication path for the voice and text data service to the mobile subscriber device 1.

Figure 2:
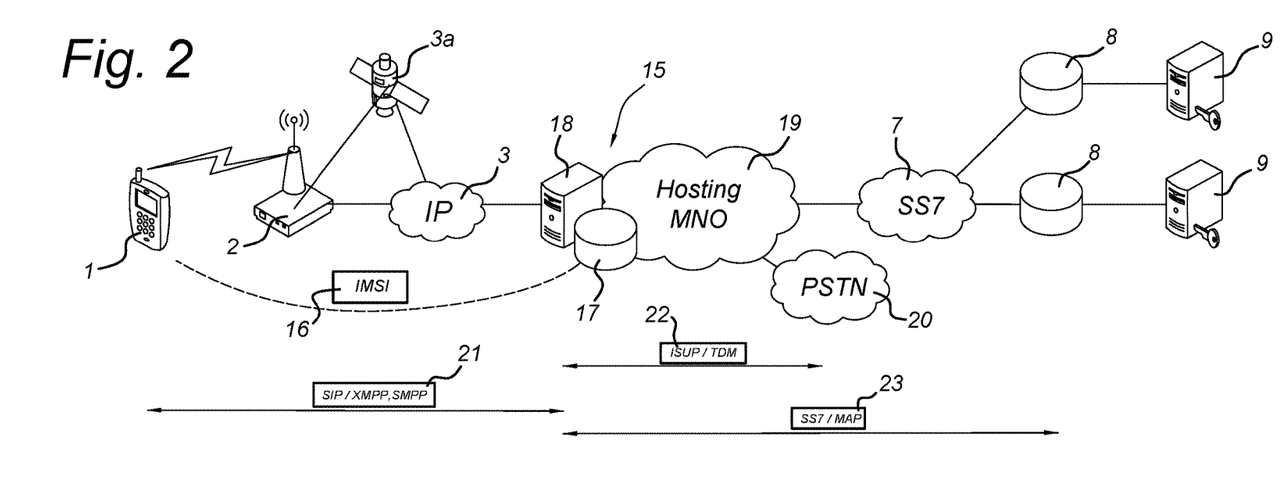
FIG. 2 shows a schematic view of an embodiment according to the present invention of an architecture for providing voice and SMS service to a mobile subscriber device.

FIG. 2 shows a schematic view of a present invention embodiment implementation. The Radius server 4, further IP network 5 and MAP proxy 6 of the prior art schematic view of FIG. 1 are replaced by a dedicated interface 15 comprising a visitor location register VLR 17, a RADIUS/protocol converter 18, and a hosting mobile network operator network environment 19. The visitor location register 17 may be part of a mobile virtual network operator network, as not all functionality of a regular network operator environment may be needed to implement the (virtual) visitor location register VLR 17. The hosting MNO network environment 19 is in connection with the public communication (SS7) network 7, and is optionally connected to a regular public switched telephony network (PSTN) 20. Also indicated in FIG. 2 is that the communication between data network 3 and access point 2 is (partially) achieved via satellite communication 3a.

In order to enable the key functionality of the present invention embodiments (outgoing and incoming voice and SMS without having a 3GPP radio access network available), a number of technical components (partially shown in FIG. 2) are needed in a chain of operation:

Full MVNO network (including a VLR) with SS7/MAP/SCPP interconnect to a Hosting MNO, including its roaming agreements. Full MVNO is needed for inbound call/SMS routing.

Soft-phone App for smart-phones that can connect through and authenticate with the WLAN (IEEE-802.1x) network using EAP-SIM and/or EAP-AKA (UMTS), with VoIP (SIP) and messaging (XMPP or SMPP) capabilities for inbound and outbound voice and SMS.

IP connection from the WLAN location to the MVNO network using back-haul paths like Satellite 3a (Inmarsat/Iridium)

Intelligent signaling conversion between the authenticator (Mobile App through EAP-SIM) and the HMNO and IP (SIP/XMPP & SMPP) towards the public SS7 interconnection network. This signaling conversion involves both authentication of the subscriber by SIM to the Home MNO, call setup and messaging.

Thus in a further embodiment, receiving an identity response from the mobile subscriber device 1 in response to an identity request packet sent from the access point 2 to the mobile subscriber device 1, is implemented using an EAP-SIM or EAP-AKA protocol.

In an even further embodiment forwarding the identity response to the home location register 8 and/or authentication center 9 and receiving identification triplets in response, is implemented using the remote authentication dial-in user service (RADIUS).

Providing a communication path for the voice service to the mobile subscriber device 1 is implemented using session initiation protocol (SIP) in a further embodiment. Furthermore, providing a communication path for the text data service to the mobile subscriber device 1 may be implemented using eXtensible Messaging and Presence Protocol/Short Message Peer-to-peer Protocol (XMPP/SMPP).

This way, a mobile soft-phone app can initiate the following sequence:
1. Authentication request for subscriber is sent to the WLAN network by EAP-SIM or EAP-AKA over IEEE 802.1 x WPA2 network infrastructures.
2. Authentication is forwarded through Radius and protocol conversion towards the Home MNO (HLR).
3. A Location Update for the subscriber is performed, placing the IMSI of the subscriber into the VLR of the MVNO network.
4. Charging and billing is started for this particular subscriber, leveraging the existing roaming agreements or using CDR/TAP file flows for special billing.
5. Incoming calls and SMS messages are routed to the MVNO network through the public (SS7) network channels, like in a normal roaming scenario.
6. Outgoing calls and SMS messages are routed from the MVNO to their destination as desired.

The entire chain of technical elements as described above with reference to FIG. 2 provides the key functions needed to deliver the seamless experience normal telephony to the end user:
End-to-end user authentication to the Home MNO using the SIM.
Registration of the user as roaming on the MVNO, routing inbound calls and SMS messages to the MVNO.
Conversion of signaling and traffic to adapt to the available bearer network; e.g. IP back-haul, SS7 interconnect and public switched (TDM) networks.

Thus in a further method embodiment, the voice and text data service to the mobile subscriber device 1 is encrypted using keys obtained during authenticating, such as the Kc key. The public communication network 7 is a GSM based network in an even further embodiment, and the data network 3 may be a wireless local area network in an even further embodiment (e.g. a IEEE 802.1x, including possibly satellite communication as part of an IP network).

The operation of the present invention embodiments relies mainly on the procedures that are handled by an intermediate system between the existing industry standard technologies. This system is referred to as the intelligent subscriber management unit (ISMU) 15, which in the schematic view of FIG. 2 would incorporate the VLR 17 and the Radius/protocol converter 18 (as well as the interfacing with the hosting mobile operator network 19).

Primary feature to the operation is the part where the subscriber's identity (IMSI) is extracted from the mobile device without utilizing a regular (3GPP) radio access network. This action is initiated by registering to a IEEE 802.1x EAP-SIM/AKA network, for example a WLAN network 3 via access point 2. The resulting RADIUS request contains the subscriber's identity (IMSI) 16. Once the subscriber is authenticated against the Home Network, this IMSI is stored in a virtual VLR 17 that resides within the ISMU system 15 and is accessible through an internal API that also enables subscriber management functions like adding, removing and billing of subscribers. A location update is sent only to the Home Network (HLR) 8 once, the subscriber actually registers to the SIP server associated with the ISMU, resulting in re-routing of voice and SMS traffic back to the switching part of the ISMU.

In general terms, the present invention in a further aspect relates to an Intelligent Subscriber Management Unit (ISMU), comprising
a (virtual) visitor location register 17, an interface to a public communication network 7 and an interface to a mobile subscriber device 1 via a data network 3,
wherein the intelligent subscriber management unit comprises a first part arranged to authenticate a mobile subscriber device 1 using a home location register 8 and/or authentication center 9 associated with the mobile subscriber device 1, while the mobile subscriber device 1 is in reach of an access point 2 associated with the data network 3, wherein authenticating comprises
receiving an identity response from the mobile subscriber device 1 in response to an identity request packet sent from the access point 2 to the mobile subscriber device 1;
forwarding (possibly including translating) the identity response to the home location register 8 and authentication center 9; and receiving identification triplets in response;
challenging the mobile subscriber device 1 using the identification triplets, and receiving a challenge response from a subscriber identity module SIM of the mobile subscriber device 1, the challenge response including the international mobile subscriber identity IMSI 16;
storing the IMSI 16 in a (virtual) visitor location register 17 and attaching the visitor location register 17 to the home location register 8; and further comprises a conversion part for converting voice and text data service between a first data format suitable for the public communication network 7 and a second data format suitable for the data network 3, and providing a communication path for the voice and text data service using the interface to the public communication network 7 and the interface to the data network 3.

The present invention may be embodied in a core component as functionally described and depicted as the RADIUS/protocol converter 18 in combination with VLR 17 in FIG. 2. This core element of the chain of technologies is at the heart of the invention and is the main element that distinguishes this invention from any other existing systems. The core element is already functionally specified above. When describing the core of the invention the diagrams of FIGS. 2 and 3 visualize the logical system and the method in which the invention works.

In a further embodiment, the ISMU further comprising a proxy server 31 for executing forwarding the identity response to the home location register 8 and/or authentication center 9, and receiving identification triplets in response, using the remote authentication dial-in user service (RADIUS).

The ISMU may even further comprise a Session Initiation Protocol (SIP) registrar 32 for providing the communication path for the voice service to the mobile subscriber device 1.

A messaging gateway 33 may furthermore be provided for providing the communication path for the text data service to the mobile subscriber device 1.

The interface to the public communication network 7 may comprise a SS7/MAP interface and/or a TDM/ISUP interface.

In an even further embodiment, the interface to the data network 3 comprises one or more of: an IEEE 802.1x EAP interface; a SIP interface; a XMPP/SMPP interface; a RTP (G.729) interface.

Figure 3:
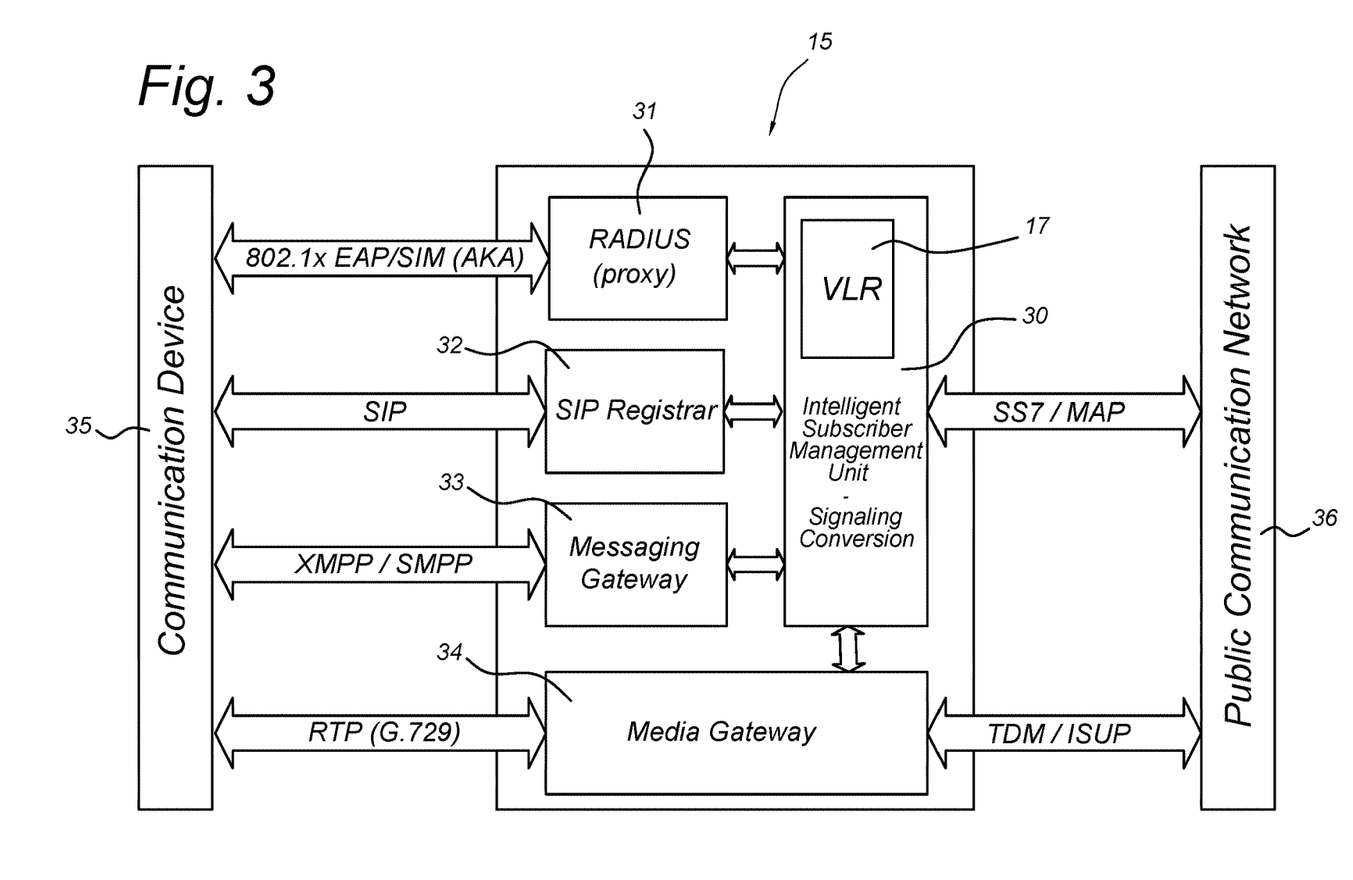
FIG. 3 shows a functional block diagram of an embodiment of an intelligent subscriber management unit according to the present invention.
Figure 4:
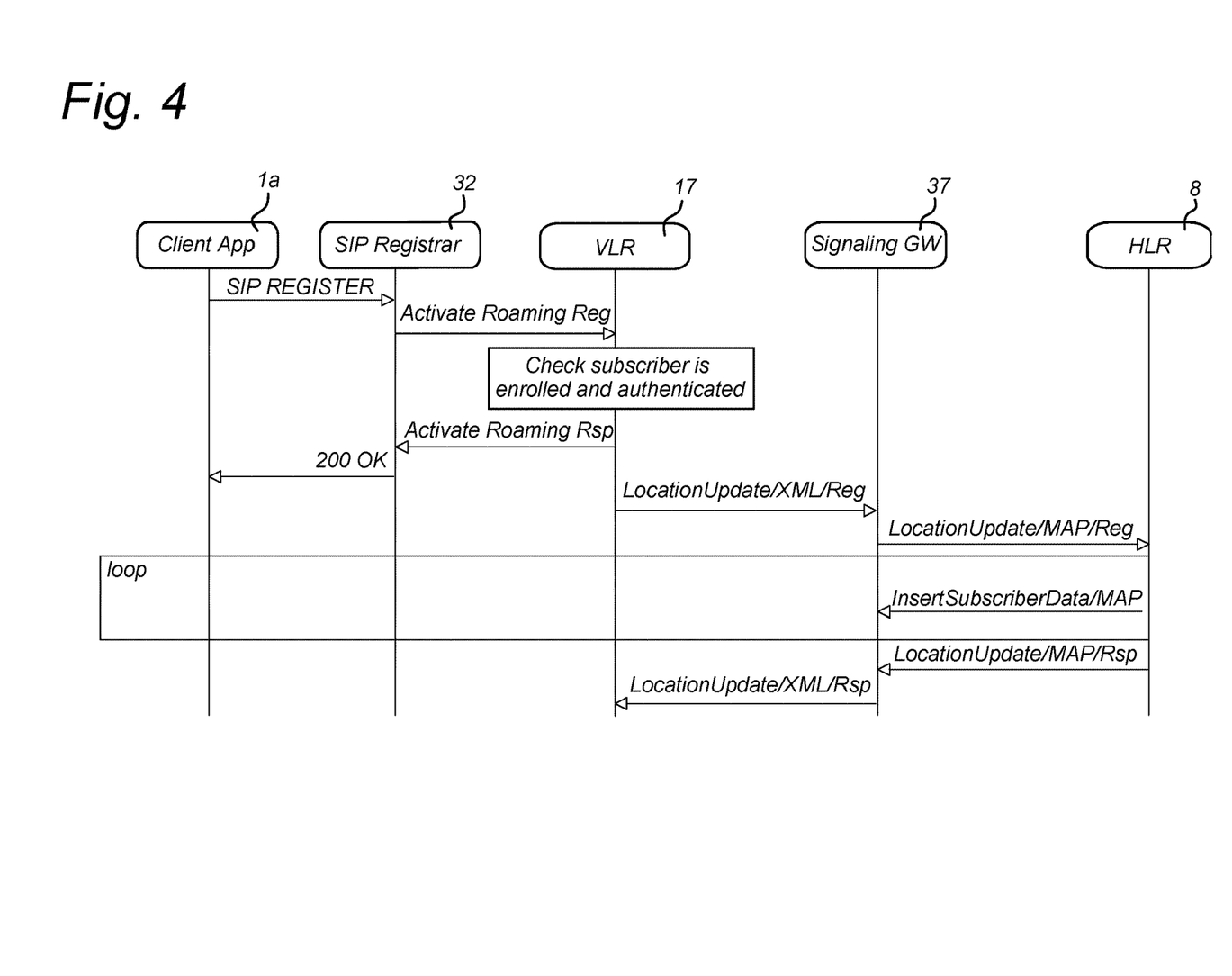
FIG. 4 shows a timing diagram of an authentication step of an embodiment of the method according to the present invention.

The depicted system bridges 802.1x authenticated (WLAN) clients to the central unit for end-to-end authentication against the home (HLR) network over SS7/MAP. After valid authentication, a SIP client can register to the SIP registrar 32. From that point on, the Intelligent Subscriber Management Unit (ISMU) 30 will request a Location Update from the home network and set up routing of voice calls and SMS messages. Transcoding from TDM to SIP/RTP is done using (encrypted) RTP streams with compression according to the G.729 standard to minimize bandwidth usage on the client side. FIG. 4 shows a message transfer example of this method embodiment, wherein a signaling gateway 37 provides the interface functionality of the VLR 17 to the HLR 8 in the home network (part of the public communication network 7).

Figure 5:
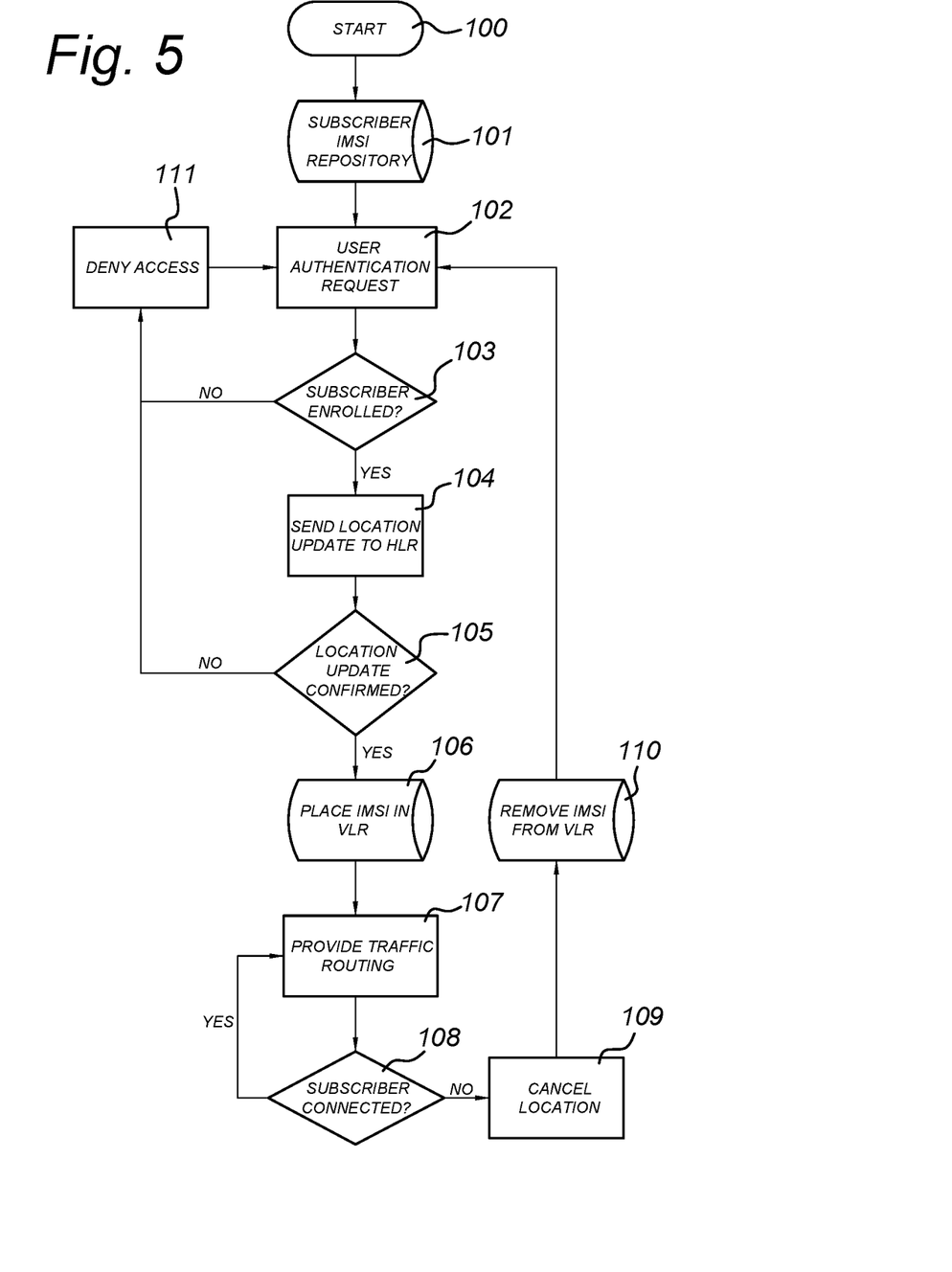
FIG. 5 shows a flow chart of an embodiment of the present invention method.

The logical procedure for subscriber authentication, authorization and registration for roaming is visualized in the flow-chart as shown in FIG. 5. From start 100 of the procedure, the IMSI repository of the mobile subscriber device 1 is accessed in step 101. A user authentication request is sent using Radius as step 102. In decision block 103 the received reply is tested, if it indicates that the subscriber associated with the IMSI is enrolled, the flow proceeds to step 104 and sends a location update to the HLR 8. If not, step 111 follows (deny access) and the flow returns to a further user authentication request in step 102.

After step 104, it is checked in decision block 105 that a confirmation of the location update is received, if not, again the flow returns to block 111. If the confirmation is received, the IMSI of the associated mobile subscriber device 1 is stored in the VLR 17 in block 106, and subsequently, traffic routing is provided (block 107). This is repeated until the subscriber becomes disconnected (decision block 108), after which the location is cancelled (step 109) and the IMSI is removed from the VLR 17 (step 110), and the flow again returns to the block of the user authentication request.

Figure 6:
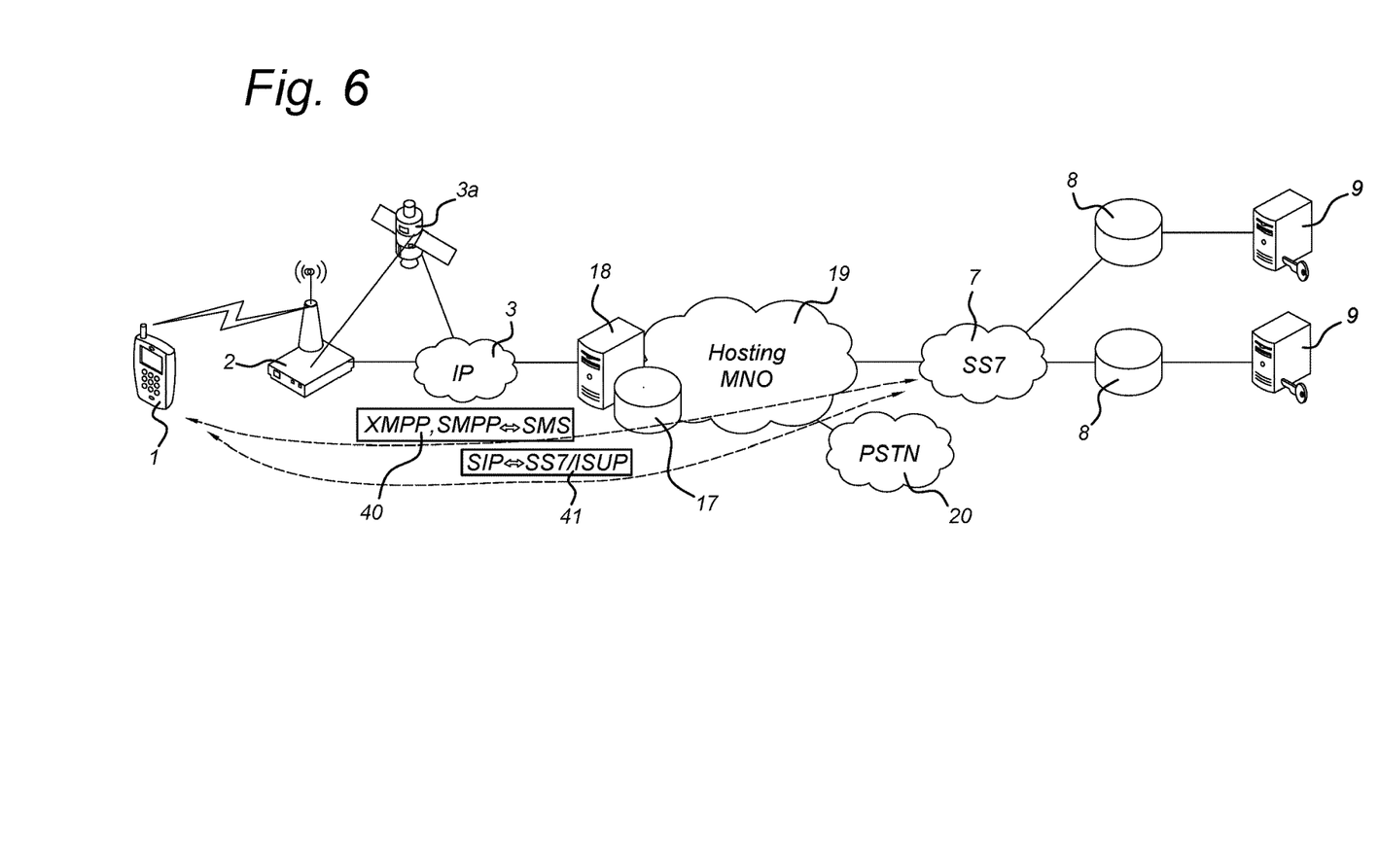
FIG. 6 shows a schematic view of communication involving a mobile subscriber device during operation.

The final situation achieved using the present invention embodiments with a communication path for the voice and text data service to the mobile subscriber device 1, is shown in the schematic architecture view of FIG. 6. Between the public communication network 7 and the mobile subscriber device 1, SMS text data is converted to XMPP or SMPP (block 40) and voice data (SS7/ISUP) is converted into SIP (block 41).

Thus according to the present invention, method and system embodiments have been described for providing roaming to a mobile subscriber for voice, SMS and data, without a 3GPP access network. This accomplished using SIM (IEEE 802.1x—EAP SIM/AKA) authentication to the home network of a roaming-enabled subscriber. A specific advantage is the ability to facilitate subscribers from multiple networks. Not just the subscribers of the hosting network but potentially all subscribers that are enabled for inbound roaming through roaming agreements between the hosting network and the home network of the subscriber.

Using the present invention embodiments, it is possible to extract the IMSI from the SIM/device and place it in the VLR without using the 3GPP radio access network, in a unique situation where the subscriber is not connected to the home network and is placed in a roaming scenario by the invention performing a Location Update.

In contradiction to weak GSM authentication and radio encryption, the invention enables enhanced security for voice and SMS traffic. GSM provides no mutual authentication, only the handset authenticates (A3/A8) towards the network. In active attacks, a GSM handset could attach to a fake base station and be forced to disable encryption (A5/0). Even when a legitimate base station is used, the air interface encryption of A5/2 is proven to weak and recorded encrypted conversations can be decrypted using weaknesses in this algorithm. This invention ensures a strong air interface encryption and mutual authentication of both the mobile unit and the network.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. Method for enabling voice and text data service from a public communication network to a mobile subscriber device, comprising
    authenticating the mobile subscriber device using a home location register and/or authentication center associated with the mobile subscriber device, while the mobile subscriber device is in reach of an access point associated with a data network,
    wherein authenticating comprises
        receiving an identity response from the mobile subscriber device in response to an identity request packet sent from the access point to the mobile subscriber device;
        forwarding the identity response to the home location register and/or authentication center; and receiving identification triplets in response;
        challenging the mobile subscriber device using the identification triplets, and receiving a challenge response from a subscriber identity module SIM of the mobile subscriber device, the challenge response including the international mobile subscriber identity IMSI;
        storing the IMSI in a visitor location register and attaching the visitor location register to the home location register;
    and further comprising
        conversion of voice and text data service between a first data format suitable for the public communication network and a second data format suitable for the data network, and
        providing a communication path for the voice and text data service to the mobile subscriber device,
    wherein providing a communication path for the voice service to the mobile subscriber device is implemented using session initiation protocol SIP and a SIP Registrar comprised by an Intelligent Subscriber Management Unit comprising the visitor location register.

2. Method according to claim 1, wherein receiving an identity response from the mobile subscriber device in response to an identity request packet sent from the access point to the mobile subscriber device, is implemented using an EAP-SIM or EAP-AKA protocol.

3. Method according to claim 1, wherein forwarding the identity response to the home location register and/or authentication center and receiving identification triplets in response, is implemented using the remote authentication dial-in user service RADIUS.

4. Method according to claim 1, wherein providing a communication path for the text data service to the mobile subscriber device is implemented using eXtensible Messaging and Presence Protocol/Short Message Peer-to-peer Protocol XMPP/SMPP.

5. Method according to claim 1, wherein the voice and text data service to the mobile subscriber device is encrypted using keys obtained during authenticating.

6. Method according to claim 1, wherein the public communication network is a GSM based network.

7. Method according to claim 1, wherein the data network is a wireless local area network.

8. Intelligent Subscriber Management Unit ISMU, comprising
- a visitor location register, an interface to a public communication network and an interface to a mobile subscriber device via a data network,
- wherein the intelligent subscriber management unit comprises a first part arranged to authenticate a mobile subscriber device using a home location register and/or authentication center associated with the mobile subscriber device, while the mobile subscriber device is in reach of an access point associated with the data network, wherein authenticating comprises
- receiving an identity response from the mobile subscriber device in response to an identity request packet sent from the access point to the mobile subscriber device;
- forwarding the identity response to the home location register and authentication center; and receiving identification triplets in response;
- challenging the mobile subscriber device using the identification triplets, and receiving a challenge response from a subscriber identity module SIM of the mobile subscriber device, the challenge response including the international mobile subscriber identity IMSI;
- storing the IMSI in a visitor location register and attaching the visitor location register to the home location register; and further comprises
- a conversion part for converting voice and text data service between a first data format suitable for the public communication network and a second data format suitable for the data network, and providing a communication path for the voice and text data service using the interface to the public communication network and the interface to the data network; and
- a Session Initiation Protocol SIP registrar for providing the communication path for the voice service to the mobile subscriber device.

9. Intelligent Subscriber Management Unit according to claim 8, further comprising a proxy server for executing forwarding the identity response to the home location register and/or authentication center, and receiving identification triplets in response, using the remote authentication dial-in user service RADIUS.

10. Intelligent Subscriber Management Unit according to claim 8, further comprising a messaging gateway for providing the communication path for the text data service to the mobile subscriber device.

11. Intelligent Subscriber Management Unit according to claim 8, wherein the interface to the public communication network comprises a SS7/MAP interface and/or a TDM/ISUP interface.

12. Intelligent Subscriber Management Unit according to claim 8, wherein the interface to the data network comprises one or more of:
- an IEEE 802.1x EAP interface
- a SIP interface
- a XMPP/SMPP interface
- a RTP interface.

* * * * *